June 16, 1942.  W. A. RIDDELL  2,286,832
PHOTOFLASH SYNCHRONIZING DEVICE
Filed Sept. 22, 1939
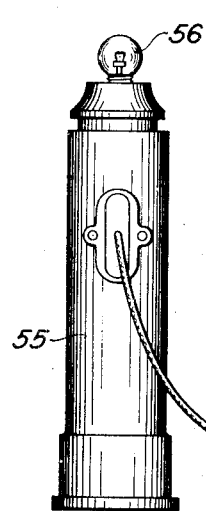
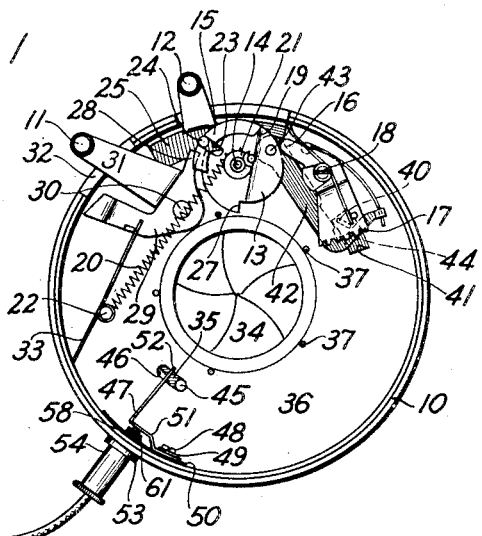
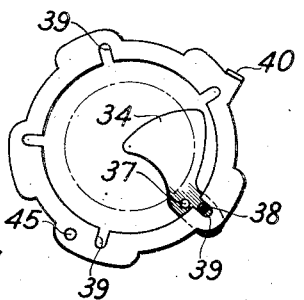
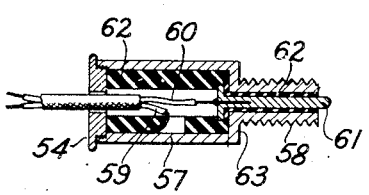
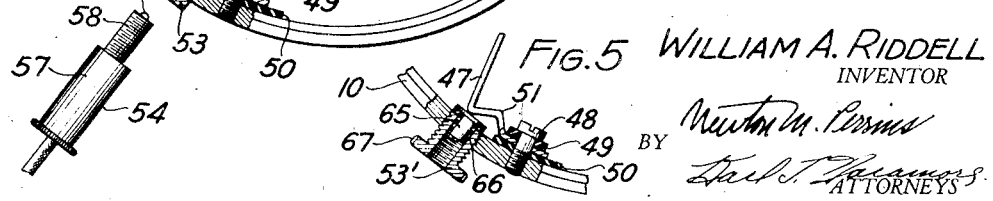
WILLIAM A. RIDDELL
INVENTOR Patented June 16, 1942

2,286,832

UNITED STATES PATENT OFFICE 2,286,832

PHOTOFLASH SYNCHRONIZING DEVICE

William A. Riddell, Rochester, N. Y., assignor to Eastman Kodak Company, Rochester, N. Y., a corporation of New Jersey Application September 22, 1939, Serial No. 296,113

9 Claims. (Cl. 67—29)

The present invention relates to photography, and particularly to a flashlight synchronizing device for automatically timing the setting off of a flash bulb with the actuation of a camera shutter.

Many synchronizing arrangements of this type have been devised, but without a doubt the ones which are the most accurate, and necessitate the least amount of adjustment, are those in which the flash bulb circuit is closed by the engagement of two contacts one of which is carried by the shutter or the operating mechanism therefor. Such an arrangement is most desirable because the closing of the bulb circuit is affected by, and dependent upon, the actuation of the shutter itself. This arrangement, however, possesses the disadvantage that the engagement of a contact carried by the shutter with a stationary contact tends to slow down the shutter below the set shutter speed, and the amount of this slowing down of the shutter depends upon the character of the materials from which the contacts are made, and the nature and extent of their engagement.

The slowing down of the shutter is not so important during the making of flash pictures because the exposure is substantially determined by the duration of the flash rather than by the speed of the shutter. However, shutters having synchronizing arrangements of the type mentioned are more often used under ordinary daylight conditions and the slowing down effect of the engaging contacts may materially affect the speed of the shutter.

Therefore, one object of the present invention is to provide a novel device for synchronizing the operation of a photoflash bulb with the operation of a camera shutter which requires no adjustment.

Another object is to provide a synchronizing arrangement wherein the switch means for closing a flash bulb circuit includes a contact on the shutter, or the movable mechanism closely associated with the operation of the shutter, and a contact adapted to be engaged by said first-mentioned contact when the shutter is operated, whereby the closing of the photoflash bulb circuit is dependent upon the operation of the shutter.

A further object is to arrange said switch contacts so that the one not on the shutter, or the actuating mechanism therefor, is normally removed from the path of the other contact when flashlight pictures are not being taken so that the speed of the shutter will not be affected under normal conditions by the engagement of said contacts.

And yet another object is to provide a synchronizing arrangement of the type described which can be easily built into any existing shutter casing without affecting the operation of the shutter, or detracting from the outward appearance of the same.

And still another object is to provide a synchronizing arrangement of the type described which is a part of the shutter and can be readily connected into a flash bulb circuit by the insertion of an electrical plug connected to the battery of a flash bulb circuit into a socket provided on, or adjacent, the shutter.

And yet another object is to provide an arrangement of the type described in which the contact normally removed from the path of the contact carried by the shutter, or the operating mechanism therefor, can be moved into the path of said last-mentioned contact for synchronizing purposes, and preferably automatically at the time and by the insertion of a plug connected to the battery into the socket associated with the shutter.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing in which, Fig. 1 is a plan view of a camera shutter with the cover removed showing the parts in a position of rest, and showing the preferred form of the synchronizing arrangement constituting the present invention with the battery and bulb circuit plugged into the shutter, Fig. 2 is an enlarged plan view of the shutter in Fig. 1 showing the parts in a set position for exposure, and showing the plug and battery and bulb circuits removed permitting the stationary contact of the synchronizing arrangement being removed from the path of the contact carried by the shutter operating mechanism, Fig. 3 is a plan view of the blade control ring of the shutter which carries one of the contacts of the synchronizing arrangement, Fig. 4 is a sectional elevation of the plug connected to the battery and bulb circuit adapted to be inserted into the socket of the shutter with the arrangement illustrated in Figs. 1 and 2, and Fig. 5 is an enlarged sectional detail showing another embodiment of socket and plug arrangement adapted to the present synchronizing device.

Like reference characters refer to corresponding parts throughout the drawing.

While the synchronizing arrangement constituting the present invention is not limited to use with shutters of between-the-lens type, since it is particularly adapted to shutters of this type it is in connection with such a shutter that it will be described. This synchronizing device may be adapted to any shutter of this type and is not limited to the particular construction of the shutter per se. Therefore, since for the purpose of illustration I have chosen to show this synchronizing arrangement as applied to a shutter of the particular type shown in my U. S. Patent 2,099,866, issued November 23, 1937, to which reference can be had for the construction and operation of the shutter per se, it is to be understood that the invention is not limited to use with such a shutter.

Referring now to Figs. 1 and 2 the construction and operation of the shutter per se will be briefly outlined to clearly illustrate the operation of the synchronizing arrangement constituting the present invention. The shutter may consist of a metal casing 10 which is preferably annular in shape and has the usual trigger 11 which trips the shutter, and the setting lever 12 for setting the shutter.

This shutter is of the type in which a master member 13 is mounted to turn on a stud 14 carried by the shutter casing. The master member 13 is provided with a cut-out portion 15 so that when the shuter is set, as indicated in Fig. 2, the arm 16 of a gear segment 17, pivoted at 18 to the shutter casing, may lie in the cut-out portion so that when the master member turns, the shoulder 19, by striking arm 16, may swing the gear segment 17, and the exposure will be determined by the position of the gear segment.

In order to turn the master member 13 upon its pivot 14 a relatively strong spring 20 is provided which passes around a pulley 21 on the master member at one end and which is anchored to a stud 22 at the other end. The master member is slotted at 23, this slot extending radially of the master member being adapted to form a cam track which is engaged by a cam follower, which is in the form of a pin 24 carried by the slide 25 attached to the setting lever 12. Consequently, when the slide 25 is moved, the setting lever 12 turns the master member through the action of the pin 24 engaging the walls of the slot 23.

In order to hold the master member in a set position there is a latch consisting of a projection 27 on the master member adapted to be engaged by a latch member 28 on the plate 29, pivoted at 30 to the shutter casing, there being an arm 31 extending through a slot 32 in the wall of the shutter casing, this arm terminating in the handle 11 so as to form the shutter trigger. When the setting lever 12 is moved to the position shown in Fig. 2, the trigger 11 under the impulse of spring 33, causes the latch member 28 to engage the projection 27 of the master member. However, as soon as the trigger is pressed downwardly in the direction shown by the arrow in Fig. 2, the latch releases the projection and the master member turns rapidly under the impulse of spring 20, causing the shutter blades to open and close in the following manner.

The shutter blades 34 may be of standard construction, see Fig. 3, and may be opened and closed by means of a blade control ring 35 which is adapted to be oscillatably mounted on the under side of a partition plate 36 in the shutter casing. As is well known, these shutter blades may be pivoted at 37 to the partition plate 36, or any other stationary part of the shutter, and include an upstanding pin 38 adapted to engage a radial slot 39 in the control ring 35. By virtue of this arrangement it will be appreciated that an oscillation of the control ring 35 will cause the shutter blades to pivot between open and closed positions. The control ring 35 is provided with an upstanding lug 40 extending upwardly through the slot 41 in the partition plate 36, as indicated in Figs. 1 and 2. This lug is engaged by a latch member 42 pivotally attached at 43 to the master member and having a shoulder 44 so positioned that a counter-clockwise movement of the master member causes the shoulder to move the lug 40, and hence the control ring 35, back and forth, opening and closing the blades, and so shaped that a clockwise movement of the master member, such as is necessary in setting the shutter, permits the member 42 to ride idly past the shutter blades, ring, lug 40.

Since the shutter mechanism per se is well known in the art, a further description of the same is considered unnecessary. All that is necessary to a clear understanding of the synchronizing arrangement described below, and constituting the present invention, is that the blade control ring 35 of the shutter oscillates in a clockwise direction to open the shutter blades 34 and in a counter-clockwise direction to close the same.

Coming now to the synchronizing arrangement constituting the present invention, I preferably mount an upstanding pin 45 on the control ring 35 which pin forms the first contact of the switch mechanism for closing the flash bulb circuit. This pin 45 is adapted to extend through an arcuate slot 46 formed in the partition plate 36 and which slot is of sufficient length to permit the control ring 35 to move through its path of oscillation unhampered. Inasmuch as the first contact is mounted on the control ring 35 to move therewith it can be considered a part of the ring, and it is to be understood that the requirement of one contact of the switch for closing the flash bulb circuit being mounted on a movable part of the shutter operating mechanism is fulfilled by this arrangement.

The second contact of the switch for the flash bulb circuit may take the form of a substantially L-shaped finger 47 mounted on the inside of the shutter casing by a screw 48, and insulated from said casing by insulating pieces 49 and 50. This second contact 47 may be made of a resilient metal so formed as at 51 that the end 52 thereof is normally removed from the path of the first contact, as shown in Fig. 2. This is the position the second contact 47 will take when the flash bulb and battery are not connected to the shutter, and when the shutter is being used under normal daylight conditions so that there will be no engagement of the two contacts which would tend to slow down the speed of the shutter. It will be readily appreciated that any suitable resilient means could be provided for normally forcing the second contact 47 from the path of the first contact 45 instead of relying upon the resiliency inherent in the shape and material of said contact, as shown and described.

Referring to Fig. 2, the shutter casing 10 is provided with an opening therethrough adjacent the second contact 47 and into which opening is threaded an internally threaded socket member 53. This socket is adapted to receive an electrical plug 54 electrically connected to the battery and flash bulb assembly indicated generally at 55, a test lamp 56 of small voltage being shown in the assembly rather than a flash bulb of known fabrication. This plug when screwed into the socket 53 is adapted to electrically connect the two lines from the flash bulb circuit to the two contacts 45 and 47 as will be hereinafter fully described, and at the same time force the contact 47 into the path of the contact 45 on the control ring.

Referring to Fig. 4, this plug 54 may comprise a metal housing 57 having an elongated threaded end 58 which is adapted to be screwed into the socket 53. One line 59 connected to the battery is grounded to this housing 57 and will consequently be electrically connected to the first contact 45 through the metal shutter casing and the metal parts making up the shutter mechanism. The other line 60 from the battery is connected to a metal insert 61 carried by the metal housing and insulated therefrom by insulation 62. This insert 61 extends through the elongated threaded end of the plug and is adapted to engage and force the second contact 47 into the path of the first contact when the plug is inserted into the socket, and at the same time electrically connects said contact to the opposite line of the battery than that connected to the contact 45.

Referring now to Fig. 1, it will be understood that when the shutter is released the first contact 45 will oscillate with the control ring 35 and during such oscillation will engage the second contact with a wiping action to complete the circuit of the flash lamp. The position which the second contact 47 assumes relative to the path of the first contact will determine the time during the shutter operation at which the flash bulb will go off. It is desirable that the contacts engage during the early opening movement of the shutter blades to account for the slight lag in the ignition characteristics of all flash bulbs, and the position which the second contact 47 assumes relative to the path of movement of the first contact will be determined by the extent to which the plug extends into the shutter casing. So that the second contact will assume the same operative position each time that it is moved into the path of the second contact, the plug may be so constructed that the shoulder 63 of the housing 57 engaging the socket 53 will determine the desired position of this contact. It will be appreciated that the second contact 47 will be deformed when engaged by the first contact with a wiping action so that the duration of the engagement of the two contacts will be over a substantial period of the shutter opening and closing movement. The contact 47 will necessarily be made of a light material so that its deformation by the first contact will not affect the speed of the shutter by an amount which would affect flashlight pictures.

Referring now to Fig. 5 a modification of the socket in the shutter casing has been shown, in which the socket is arranged so that the second contact 47 may be moved into the path of the first contact 45 without the aid of the plug 54. In this embodiment the socket member 53' is screw threaded through the shutter casing as before, but includes a socket contact 65 insulated from the socket proper by insulation 66. Second contact 47 is normally spring pressed into engagement with the socket contact 65 so that the position of the same relative to the path of the first contact 45 can be determined by screwing the socket 53' into and out of the shutter casing. The plug 54 will be the same as above described with the exception that the insert 61 thereof instead of projecting through the shutter casing to directly engage the second contact will be electrically connected to the socket contact 65. In Fig. 5 the socket 53' is shown turned out of the casing 10 to a positon where the second contact 47 is allowed to spring away from the path of the first contact. The flange 67 of the socket 53' is knurled to facilitate turning the same, and when the socket 53' is turned until the under side of the flange strikes the shutter casing the second contact 47 will be properly positioned in the path of the first contact 45. It will be understood that if desired the position of the second contact relative to the path of the first contact could be varied by adjustment of the socket member 53' into or out of the casing, and a suitable scale being provided to indicate the extent of such adjustment. With this latter embodiment the adjustment of the second contact relative to the first is a feature of the shutter itself and the two contacts are both electrically connected to the socket at all times.

It will be readily understood by those skilled in the art that a synchronizing device constructed in accordance with the present invention is compact, being essentially a part of the shutter itself, and is extremely accurate since it requires no synchronizing adjustments on the part of the operator. When the flash bulb and battery assembly 55 are connected to the shutter casing by a conventional plug, and the socket is turned down in the shutter casing in the case of the second embodiment, the device is ready for operation. Since the second contact can be removed from the path of the first contact when flashlight pictures are not being taken, the normal operation of the shutter under daylight conditions is not impaired. If the second contact was left in a position to be engaged by the first contact regardless of whether or not flashlight pictures were being taken, the engagement of the two would to some extent affect the normal speed of the shutter, which change in speed would undoubtedly be critical in daylight photography where the shutter speed is a dominant factor in correct exposure. This synchronizing arrangement is exceedingly simple and can be adapted to any existing shutter, or new shutter, with the least added expense to the shutter as a whole. It is built into the shutter so as to essentially become a part of the same thus doing away with the use of cumbersome and unsightly synchronizing devices now on the market.

Although I have shown and described certain specific embodiments of my invention, I am fully aware that many modifications thereof are possible. This invention therefore is not to be restricted except in so far as is necessitated by the prior art and by the spirit of the appended claims.

Having thus described my invention what I claim is new and desire to secure by Letters Patent of the United States is:

1. In a flashlight synchronizing device the combination of a photographic shutter including a casing, a shutter operating mechanism within said casing, one movable part of said mechanism adapted to constitute a first contact, a second contact mounted in said casing adjacent said shutter operating mechanism to move into and out of the path of said first contact whereby it is disposed to be engaged by said first contact when the shutter is actuated, means for connecting each of said two contacts to opposite sides of a photo-flash bulb circuit, and means associated with said last mentioned means for moving said second contact into and out of the path of said first contact when the contacts are connected to, and disconnected from, said circuit, respectively.

2. In a flashlight synchronizing device the combination of a photographic shutter, a shutter operating mechanism, one movable part of said mechanism adapted to constitute a first contact, a second contact mounted adjacent said shutter operating mechanism to move into and out of the path of said first contact whereby it is disposed to be engaged by said first contact when the shutter is actuated, said second contact being normally removed from the path of said first contact, means for optionally connecting each of said two contacts to opposite sides of a photo-flash bulb circuit, and means for automatically moving said second contact into the path of said first contact in response to said contacts being connected to photo-flash bulb circuit.

3. In a flashlight synchronizing device the combination of a photographic shutter, a shutter operating mechanism, one movable part of said mechanism adapted to constitute a first contact, a second contact mounted adjacent said shutter operating mechanism to move into and out of the path of said first contact whereby it is disposed to be engaged by said first contact when the shutter is actuated, said second contact being normally removed from the path of said first contact, means for optionally connecting each of said two contacts to opposite sides of a photo-flash bulb circuit, said last mentioned means adapted to automatically move said second contact into the path of said first contact in response to connection of said contacts to the photo-flash bulb circuit.

4. In a flashlight synchronizing device the combination of a photographic shutter, a shutter operating mechanism, one movable part of said mechanism adapted to constitute a first contact, a second contact mounted adjacent said shutter operating mechanism to move into and out of the path of said first contact whereby it is disposed to be engaged by said first contact when the shutter is actuated, said second contact being normally removed from the path of said first contact, an electrical socket member adapted to receive an electrical plug connected to a photo-flash circuit, and having one socket contact electrically connected to said first contact, and another socket contact electrically connected to said second contact, and means including said socket member for moving said second contact into the path of said first contact.

5. A flashlight synchronizing device comprising a photographic shutter including a casing, a shutter operating mechanism in said casing, one movable part of said mechanism adapted to constitute a first contact, a second contact mounted in said casing to move into and out of the path of said first contact whereby it is disposed to be engaged by said first contact when the shutter is actuated, said second contact being normally removed from the path of said first contact, an electrical socket member in said casing adapted to receive an electrical plug connected to a photo-flash circuit, and having one socket contact electrically connected to said first contact, and a second socket contact electrically contact member when said plug is inserted into said nected to and adapted to physically engage said second contact, said socket member having a screw threaded connection with said casing whereby the same may be adjusted to move said second contact into the path of said first contact.

6. A flashlight synchronizing device comprising a photographic shutter including a casing, a shutter operating mechanism in said casing, one movable part of said mechanism adapted to constitute a first contact, a second contact mounted in said casing to move into and out of the path of said first contact whereby it is disposed to be engaged by said first contact when the shutter is actuated, said second contact being normally removed from the path of said first contact, an electrical socket member extending into said casing and into engagement with said second contact for moving the same into the path of said first contact, said socket member having one socket contact electrically connected to said first contact, and another socket contact electrically connected to said second contact.

7. A flashlight synchronizing device comprising a photographic shutter including a casing, a shutter operating mechanism in said casing, one movable part of said mechanism adapted to constitute a first contact, a second contact mounted in said casing to move into and out of the path of said first contact whereby it is disposed to be engaged by said first contact with a wiping action when the shutter is actuated, said second contact being normally removed from the path of said first contact, an electrical socket member extending through said casing into engagement with said second contact and screw threadedly mounted in said casing to move between a first position wherein it permits a removal of said second contact from the path of said first contact, and a second position wherein it forces said second contact into the path of said first contact, said electrical socket being adapted to receive an electrical plug connected to a photo-flash circuit and having one socket contact electrically connected to said first contact and a second socket contact electrically connected to said second contact.

8. In a flashlight synchronizing device the combination of a photographic shutter including a casing, a shutter operating mechanism in said casing, one movable part of said mechanism adapted to constitute a first contact, a second contact mounted within said casing to move into and out of the path of said first contact whereby it is disposed to be engaged by said first contact when the shutter is actuated, means normally moving said second contact from the path of said first contact, a socket member extending into said casing and being electrically connected to said first contact, an electrical plug connected in the circuit of a photo-flash bulb adapted to be placed in said socket, and including a first plug contact adapted to be electrically connected to said socket member, and a second plug contact adapted to be electrically connected to said second contact, and means for automatically moving said second contact into the path of said first contact in response to said plug being inserted into said recess.

9. In a flashlight synchronizing device the combination of a photographic shutter including a casing, a shutter operating mechanism in said casing, one movable part of said mechanism adapted to constitute a first contact, a second contact mounted within said casing to move into and out of the path of said first contact whereby it is disposed to be engaged by said first contact when the shutter is actuated, means normally moving said second contact from the path of said first contact, a socket member extending into said casing and being electrically connected to said first contact, an electrical plug connected in the circuit of a photoflash bulb adapted to be placed in said socket, a first plug contact on said plug adapted to be electrically connected to said socket member, and a second plug contact on said plug adapted to extend through said socket member into engagement with said second con-socket member, and adapted to move said second contact into the path of said first contact.

WILLIAM A. RIDDELL.

CERTIFICATE OF CORRECTION.

Patent No. 2,286,832.  June 16, 1942.

WILLIAM A. RIDDELL.

It is hereby certified that error appears in the printed specification of the above numbered patent requiring correction as follows: Page 2, first column, line 36, for "shuter" read --shutter--; page 4, second column, line 5, claim 5, strike out "tact member when said plug is inserted into said" and insert the same after "con-" on page 5, second column, line 7, claim 9; and that the said Letters Patent should be read with this correction therein that the same may conform to the record of the case in the Patent Office.

Signed and sealed this 1st day of September, A. D. 1942.

(Seal)

Henry Van Arsdale,
Acting Commissioner of Patents.